United States Patent

Carlson et al.

[15] 3,676,333
[45] July 11, 1972

[54] HYDRODESULFURIZATION UTILIZING MULTIPLE HYDROGEN RECYCLE STREAMS

[72] Inventors: Edgar Carlson, Allison Park, Pa.; William R. Lehrian, Tokyo, Japan

[73] Assignee: Gulf Research & Development Company, Pittsburgh, Pa.

[22] Filed: March 26, 1970

[21] Appl. No.: 25,115

[52] U.S. Cl. ........................................................208/209
[51] Int. Cl. ......................................................C10g 23/00
[58] Field of Search..................208/209, 211, 212, 216, 213, 208/210, 217

[56] References Cited

UNITED STATES PATENTS

| | | | |
|---|---|---|---|
| 2,920,033 | 1/1960 | Beavon | 208/209 |
| 2,755,225 | 7/1956 | Porter et al. | 208/211 |
| 2,840,513 | 6/1958 | Nathan | 208/209 |
| 3,563,887 | 2/1971 | Fraser et al. | 208/216 |
| 3,362,903 | 1/1968 | Eastman et al. | 208/213 |
| 2,902,440 | 9/1959 | Beuther et al. | 208/210 |
| 2,937,134 | 5/1960 | Bowles | 208/210 |

*Primary Examiner*—Delbert E. Gantz
*Assistant Examiner*—G. J. Crasanakis
*Attorney*—Meyer Neishloss, Deane E. Keith and Thomas G. Ryder

[57] ABSTRACT

A portion of the effluent gas from a hydro-desulfurization process is treated for removal of hydrogen sulfide and admixed with the hydrocarbon fraction before entry into the feed heater. Untreated effluent gas containing hydrogen and hydrogen sulfide is then admixed with the preheated hydrocarbon-hydrogen gas mixture prior to entry into the reactor. Treating only that portion of the effluent gas which passes through the heater minimizes coking and corrosion problems in the heater but it also reduces the effort previously required for treating all the recycle gas.

7 Claims, 1 Drawing Figure

PATENTED JUL 11 1972  3,676,333
INVENTORS.
EDGAR CARLSON
WILLIAM R. LEHRIAN
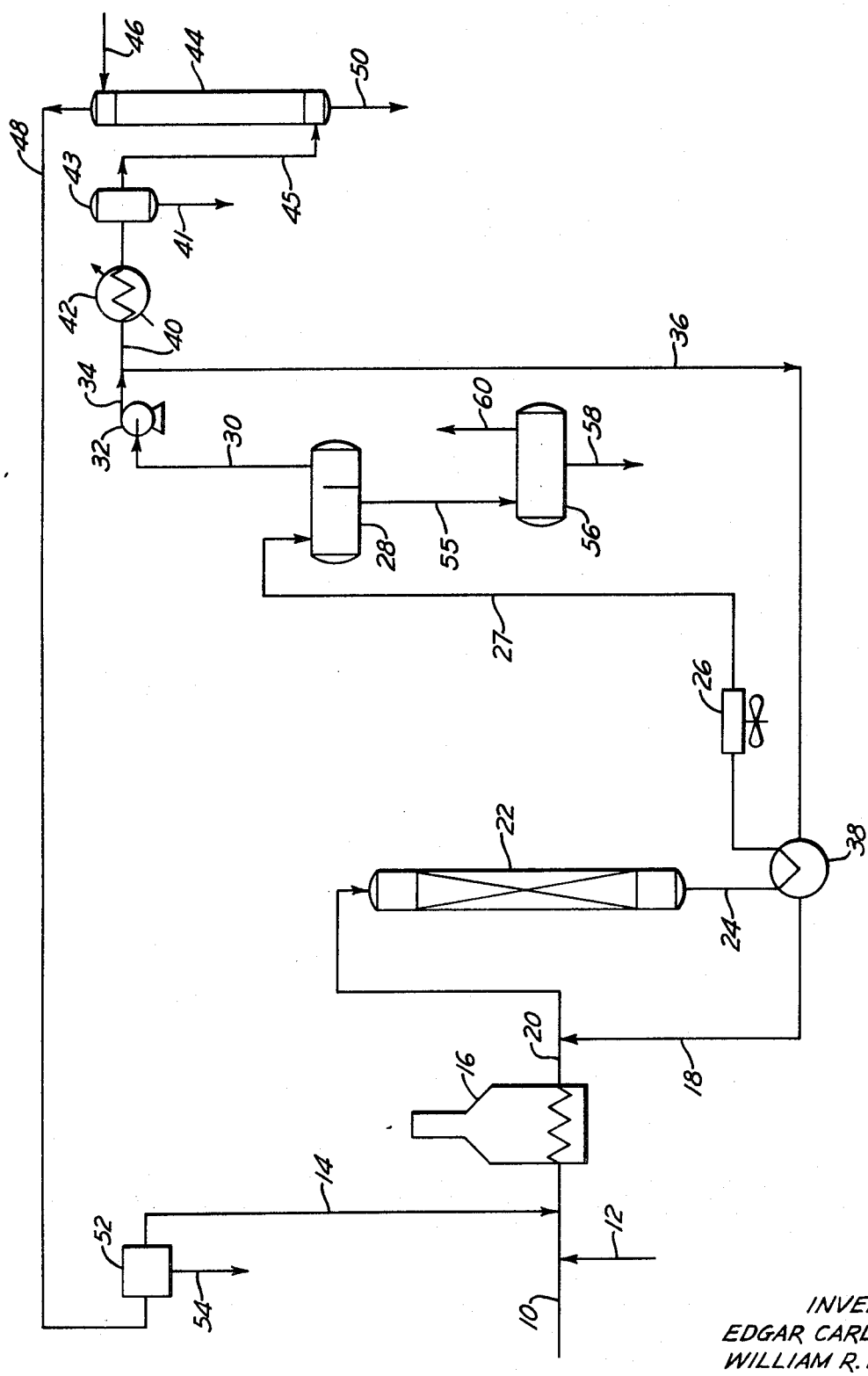

HYDRODESULFURIZATION UTILIZING MULTIPLE HYDROGEN RECYCLE STREAMS

This invention relates to a novel hydrocarbon desulfurization process. More particularly, this invention relates to a hydrocarbon desulfurization process wherein a high purity hydrogen sulfide by-product stream is recovered.

Hydrocarbon fractions that contain sulfur have been conventionally subjected to a catalytic desulfurization treatment in the presence of hydrogen. Unreacted hydrogen, along with hydrogen sulfide and other non-condensible gases formed in the desulfurization reaction, is contained in the reaction effluent. It is highly desirable to separate the hydrogen from the reaction effluent stream for recycle to the reaction zone. The hydrogen sulfide and other non-condensible gas should be separated from the hydrodesulfurized product in order to prevent equipment corrosion and contamination of the hydrocarbon product.

In order to recover a hydrocarbon product substantially free of hydrogen sulfide, it has been proposed to cool the entire desulfurization reaction effluent to a sufficiently low temperature in order to condense the major portion of the hydrocarbon product and permit a separation thereof into a liquid fraction and a vapor fraction. The liquid fraction and the vapor fraction are separately treated for the removal of hydrogen sulfide and the remaining portion of the vapor fraction, which consists essentially of hydrogen, is recycled to the hydrodesulfurization reaction zone.

In hydrodesulfurization processes, it is essential that the total recycle gas stream be treated to remove hydrogen sulfide when the partial pressure of the hydrogen sulfide is high enough to cause severe corrosion in the furnace or heater employed to heat the hydrocarbon charge stock to the proper temperature for the desulfurization reaction. An amine solution, e.g., diethanolamine, triethanolamine, etc., has previously been employed for the removal of hydrogen sulfide from the recycle gas stream. However, as the process pressure is increased, hydrocarbons present in the recycled gas stream are partially removed in the hydrogen sulfide treater along with the hydrogen sulfide product. The presence of such hydrocarbons is highly undesirable in the hydrogen sulfide product when the hydrogen sulfide is employed as a charge stock to a sulfur production unit since the presence of excessive hydrocarbons along with the hydrogen sulfide will cause the production of a black and unsalable sulfur. This is particularly true of hydrocarbons containing in excess of three carbon atoms per molecule.

As the process pressure is increased, the amount of hydrocarbons per mol of hydrogen sulfide removed by the treating agent will increase. In addition, the hydrocarbon contaminants can be present in quantities greater than solubility data would predict by means of condensation and/or entrainment in the recycle gas. Condensation and entrainment can be reduced by design. However, solubility is a natural effect and cannot be reduced or eliminated by design.

It has now been found that a hydrogen sulfide by-product for use as feed to a sulfur unit can be produced which is substantially reduced in its heavy hydrocarbon content and severe corrosion in the hydrodesulfurization feed heater can be eliminated by the desulfurization process of the present invention, which comprises passing a hydrocarbon charge stock to a hydrodesulfurization zone, separating a gaseous hydrogen sulfide-containing effluent stream from the effluent of the hydrodesulfurization zone, subjecting a portion of the gaseous stream to a hydrogen sulfide removal treatment so as to produce a substantially hydrogen sulfide-free gaseous stream, and recycling the remaining portion of the gaseous stream for admixture with the hydrocarbon charge stock to the hydrodesulfurization treatment.

We have found that by passing only a portion of the hydrogen sulfide-containing gas stream to the hydrogen sulfide removal treatment and recycling the purified hydrogen stream, sufficient hydrogen sulfide is removed from the recycle gas stream that severe corrosion will not result in the feed heater, while at the same time the amount of hydrocarbons removed along with the hydrogen sulfide in the hydrogen sulfide removal zone is sufficiently small that a salable sulfur by-product can be produced from the recovered hydrogen sulfide. The substantially hydrogen sulfide-free stream is admixed with the hydrocarbon charge stock prior to being passed through the preheater so as to provide sufficient hydrogen in order to prevent excessive coking in the desulfurization feed heater. Untreated gaseous effluent stream from the desulfurization treatment is recycled for admixture with the hydrocarbon charge stock to the desulfurization treatment after the charge stock has been preheated.

In order to more fully understand the nature of the present process, reference is made to the accompanying drawing which is substantially a schematic diagram of a process which embodies the present invention.

Referring to the drawing, a sulfur-containing hydrocarbon fraction, such as a naphtha, furnace oil, cracking charge stock, shale oil, coke-oven oil, residual-containing hydrocarbons such as whole or reduced crude and the like, is fed via line 10 and is admixed with make-up hydrogen, which is introduced by means of the line 12, and treated recycle hydrogen, which is introduced by means of the line 14. The hydrogen-hydrocarbon admixture is passed to a gas-fired heater 16. If the hydrocarbon fraction which is introduced by means of the line 10 is a "whole crude" or the like, it is preferably separated from water or sediment and is desalted, but need not be processed in any other manner.

The hydrogen-hydrocarbon admixture is heated in the furnace 16 to a temperature suitable for catalytic desulfurization. For example, suitable temperatures for desulfurization include those in the range of between about 500° and about 900° F., preferably between about 700° and about 850° F. The make-up hydrogen stream 12 contains high purity hydrogen and comprises, for example, about 93 percent hydrogen by volume. The recycled hydrogen stream 14 will contain some hydrogen sulfide; however, the amount of hydrogen sulfide is sufficiently low that corrosion will not occur in the heater 16 to any substantial degree. Accordingly, the recycled gas stream is a desulfurization reactor effluent stream that has been treated for hydrogen sulfide removal, e.g., by amine treatment. Otherwise, the hydrogen sulfide partial pressure in the recycled gas stream is high enough to cause severe corrosion problems in the feed heater when the heater is fabricated from normal materials of construction.

Sufficient hydrogen-containing recycled gas must be added to the hydrocarbon feed to the heater along with the make-up hydrogen to prevent excessive coking in the feed heater. Thus, for example, sufficient recycle gas is admixed with the make-up hydrogen to provide about 1500 standard cubic feet of hydrogen per barrel of hydrocarbon feed to the feed heater 16.

After the hydrogen-hydrocarbon admixture has been heated to a temperature suitable for desulfurization, additional recycle hydrogen can be added to the admixture by means of the line 18. This additional recycle hydrogen stream has been preheated by heat exchange with a reactor effluent stream but has not been treated for removal of hydrogen sulfide. The desulfurization charge stock may now be passed to catalyst guard beds (not shown), if desired, for the removal of impurities that are detrimental to the desulfurization catalyst. The preheated stream is passed by means of the line 20 to a desulfurization reactor 22, which is provided with one or more beds of a conventional desulfurization catalyst.

Suitable desulfurization catalysts include metals of Group VIA (e.g., molybdenum and tungsten), Group VIII (e.g., iron, cobalt, nickel) of the Periodic Chart, their oxides or sulfides, alone, or in admixture, and preferably provided on a non-cracking support such as alumina, bauxite and the like. Specific examples of such catalysts include, Ni—Co—Mo on alumina, Co—Mo on alumina, sulfided Ni—W on alumina, and the like.

The hydrodesulfurization reaction can be conducted at a temperature, for example, in the range of between about 500° and about 900° F., preferably between about 700° and about 850° F. Suitable pressures for the desulfurization reactor are between about 250 and about 4,000 psig, preferably between about 500 and about 3,000 psig. The liquid hourly space velocity (LHSV) employed is in the range of between about 0.25 and about 16, preferably between about 0.5 and about 2.0. The term "liquid hourly space velocity" as employed herein refers to the volume of desulfurization feed (measured at 60° F.) per hour per volume of catalyst employed. Hydrogen is passed along with the hydrocarbon feed to the reactor 22 at a rate of between about 200 and about 20,000 standard cubic feet per barrel of hydrocarbon charge, preferably between about 5,000 and about 10,000 standard cubic feet per barrel.

The desulfurized reactor effluent is discharged from the reactor 22 by means of the line 24. This stream can be heat exchanged with a recycle hydrogen gas stream in heat exchange means 38, and/or heat exchanged with the feed to the hydrodesulfurization reactor and/or the crude feed (by a means not shown). Next, the temperature of the reactor effluent is further reduced by a suitable heat exchange means such as an aerial cooler 26. The cooled effluent is then passed by means of conduit 27 to a flash drum 28 for the separation of liquid from vapor. The flash drum 28 is a high pressure flash drum and may be operated, for example, under a pressure of about 2,000 psig. Vapor comprising substantial amounts of hydrogen and lesser amounts of hydrogen sulfide is withdrawn from the flash drum 28 by means of the line 30 and is conducted to a compressor 32.

A portion of the compressed gas is recycled by means of conduits 34, 36 and 18 for admixture with the desulfurization charge stock in conduit 20 at a point which is downstream from the heater 16. The hydrogen-containing recycle gas stream 36 is first heat exchanged with the desulfurization reactor effluent stream 24 in the heat exchanger 38. This raises the temperature of the untreated recycle gas stream, which will not pass through the heater 16, at this point to a temperature, for example, of about 700° F. When combined with the stream 20, this recycle stream permits control of the temperature of the desulfurization charge stream to that desired for introduction into the desulfurization reactor 22.

The amount of untreated recycle gas which is passed by means of conduits 36 and 18 back to the desulfurization reactor 22 is suitably in the range of between about 60 and about 90 percent of the total recycle gas of line 30, preferably between about 75 and about 85 percent, with 80 percent of the total recycle gas stream being especially preferred. The remaining portion of recycle gas, which is between about 10 and about 40 percent, preferably about 15 to about 25 percent, and most preferably about 20 percent of the total recycle gas stream, is conducted by means of line 40 to a cooler 42 where the temperature of the stream is reduced to a temperature below the water dew point and thence to a separator 43 wherein water is separated and removed from the system by means of line 41. The balance of this portion of the recycle gas is then passed via line 45 to a hydrogen sulfide removal treatment which may be, for example, a high pressure liquid absorbent contactor 44. A suitable treating agent, such as an amine, is introduced into the contactor 44 by means of the line 46, preferably in a countercurrent fashion with respect to the gas stream to be treated. A hydrogen-rich, hydrogen sulfide-depleted stream is withdrawn from contactor 44 by means of line 48 while a stream of hydrogen sulfide-rich treating agent is removed from contactor 44 by means of line 50.

Suitable conditions for the amine contactor 44 include a temperature in the range between about 70° and about 170° F., preferably 110° and about 140° F. Suitable pressures include those in the range of between about 250 and about 4,000 psig, preferably between about 500 and about 3,000 psig.

The hydrogen-rich, hydrogen sulfide-depleted recycle stream of line 48, after passing through the knock-out drum 52, is recycled for admixture with the desulfurization charge stock by means of the conduit 14. Entrained portions of amine are withdrawn from the knock-out drum 52 by means of the line 54. Sufficient recycle gas must be contacted in the treater 44 and recycled for introduction by means of the line 14 upstream of the heater 16, so that when the hydrogen recycle gas is added to the liquid feed along with the make-up hydrogen, coke will not be produced in the feed heater 16 to a substantial degree.

The amount of hydrogen sulfide-depleted recycle gas that must be added to the liquid feed upstream of the heater depends upon the susceptibility of the liquid feed to coke production in the heater 16. Accordingly, a hydrocarbon feed which is highly susceptible to coke production in the heater 16 will require greater amounts of the hydrogen sulfide-depleted hydrogen recycle stream than will hydrocarbon charge stocks which are less susceptible to coke formation.

The amine treated recycled gas stream which is admixed with the hydrocarbon feed to the desulfurization treater 22 by means of the line 14 can suitably provide between about 500 and about 3,000 standard cubic feed of hydrogen per barrel of hydrocarbon desulfurization charge stock, preferably between about 1,000 and about 2,000 standard cubic feet of hydrogen per barrel of oil to be treated. As previously discussed, the remainder of the recycled gas stream, i.e., the untreated gas, will by-pass the feed heater 16 and be introduced by means of the conduit 18 for admixture with the desulfurization charge stock.

In this manner, hydrocarbon removal from the recycle stream is minimized, since only a portion of the recycle gas stream is treated for hydrogen sulfide removal. Normally, when the total recycle gas stream is treated for hydrogen sulfide removal by amine contacting, about 80 percent of the hydrogen sulfide formed during the hydrodesulfurization process is removed and the hydrogen sulfide concentration throughout the entire system is maintained at a comparatively low level. In the practice of the present invention, however, since only a portion of the recycle gas stream is treated for hydrogen sulfide removal, the overall level of hydrogen sulfide within the system stabilizes at a comparatively higher level, once recycle has commenced. As will be understood, when treating equal volumes of gas containing hydrogen sulfide, a greater absolute quantity of hydrogen sulfide will be removed from the gas initially containing the higher hydrogen sulfide concentration. Accordingly then, when treating only a portion of the recycle gas stream, e.g., about 20 percent of the total, a greater absolute quantity of hydrogen sulfide will be removed per volume of gas treated than will be removed when treating the total recycle gas. In the particular instance of treating only about 20 percent of the total recycle gas about 45 percent of the hydrogen sulfide formed in the hydrodesulfurization process will be removed as opposed to 80 percent of the hydrogen sulfide formed when treating the total recycle gas. Thus, it will be seen that in fact less gas is treated per mol of hydrogen sulfide removed and since the potential hydrocarbon inclusion in the hydrogen sulfide removed is dependent solely upon the volume of gas treated, a reduction in the quantity of recycle gas treated inherently results in a reduction in the quantity of hydrocarbons included with the hydrogen sulfide, thereby resulting in a substantially higher ratio of mols of hydrogen sulfide removed per mol of hydrocarbon removed.

The absorption and entrainment of hydrocarbon in the amine treating agent along with the hydrogen sulfide cannot be prevented. However, the temperature of the recycle gas stream is adjusted by means of the cooler 42 so that the gas stream of line 45 fed to the treater 44 will be at a temperature which is below its water dew point, as mentioned above, but at or above its hydrocarbon dew point. Additionally, a differential is maintained between the inlet temperature of the gas stream of line 45 to treater 44 and the inlet temperature of the treating agent of line 46 to treater 44 so that the gas of line 45 is heated as it passes through treater 44 and is maintained at a temperature above the hydrocarbon dew point. This limits condensation of the heavy hydrocarbons to a large extent and prevents their removal with the treating agent which is discharged with the hydrogen sulfide-containing treating agent by means of line 50 from the bottom of the treater. The hydrogen sulfide-rich treating agent stream that is withdrawn by means of the line 50 is passed to a regenerator (not shown) for the recovery of the hydrogen sulfide from the treating agent. The recovered hydrogen sulfide is passed to a sulfur plant for the production of sulfur. Since the sulfur by-product has a reduced quantity of hydrocarbons therein, the production of a salable sulfur product is made possible.

Referring again to the flash drum 28, a liquid stream 55 is removed therefrom and is introduced into low pressure flash drum 56 in which the stream 54 is separated into a liquid fraction 58 and a vapor fraction 60. The vapor fraction 60 comprises hydrogen and hydrogen sulfide and may be passed to a hydrogen sulfide removal treatment (not shown) for removal of hydrogen sulfide and the production of a hydrogen-rich recycle stream. The liquid fraction 58 comprises a desulfurized liquid hydrocarbon fraction which may be further treated for the removal of any residual hydrogen sulfide therein (by a means not shown).

Alternatively, the charge stock which is introduced by means of line 10 may be a high boiling portion of a crude oil which has been prefractionated to separate a light ends fraction therefrom prior to subjecting the heavy fraction to a desulfurization treatment. In that event, the liquid fraction withdrawn from the low pressure flash drum 56 may be passed from the line 58 to a tower, such as a stripper, wherein the hydrogen sulfide content thereof is stripped therefrom with hydrogen and the resulting fraction is blended with the previously separated light-ends fraction.

Obviously, the drawing has been greatly simplified so that various pumps, compressors, heat exchange means, and the like have not been shown for the sake of simplicity. Thus, where single heat exchange means and compressors have been indicated, a plurality of such means may be suitably employed.

In the foregoing manner, the process of the present invention permits the production of a high purity, salable sulfur by-product from the hydrogen sulfide while at the same time eliminating severe corrosion problems in the desulfurization charge stock heater.

This invention may be best understood by reference to the following specific example, which is illustrative only and is not intended to be limiting as to scope.

EXAMPLE

An arrangement similar to that illustrated in the drawing is employed for the purposes of this example. A Kuwait crude oil is desalted and dewatered and is then heated in a fired heater and is passed to a flash drum at the rate of 44,000 BPSD (barrels per stream day). The flash drum is operated at a temperature of 600° F. and under a pressure of 115 psia, thus resulting in a separation of the crude oil into a light fraction comprising 24 percent by volume of the total crude fed.

The flashed crude heavy fraction is compressed to the pressure required for desulfurization and is then mixed with a make-up hydrogen stream comprising 93 percent by volume hydrogen and a recycle hydrogen-containing gas stream that had been amine-treated for the removal of the hydrogen sulfide. Sufficient recycle gas is amine-treated so that when joined with the make-up hydrogen there will be provided about 1,500 standard cubic feet of hydrogen per barrel of flash crude charge. This amount of recycle hydrogen was considered necessary to prevent excessive coking in the feed heater when processing the flashed Kuwait crude fraction.

The mixture of liquid feed and hydrogen is then heated to a maximum temperature of about 800° F. in a gas-fired heater. At the heater outlet, the hydrogen-charge stock admixture is joined with additional recycle gas that had not been amine-treated for hydrogen sulfide removal. This stream comprises about 80 mol percent hydrogen and about 3 mol percent hydrogen sulfide. The untreated recycle gas stream is heat exchanged with the reactor effluent from a hydrodesulfurization reactor to raise its temperature and is then admixed with the fired heater effluent. The average temperature at reactor inlet of this combined stream is about 750° F.

The hydrocarbon-hydrogen admixture then flows to catalyst guard beds and is passed to a hydrodesulfurization reactor. The reactor is provided with a nickel-cobalt-molybdenum desulfurization catalyst on an alumina support. Other reaction conditions employed in the hydrodesulfurization reactor are an LHSV of amount 1 and a hydrogen partial pressure of about 2,000 psi.

Reactor effluent is withdrawn at a maximum temperature of about 815° F. and is heat exchanged with recycle gas, feed to the hydrodesulfurization reactor and the crude oil feed. At the outlet of the crude oil feed heat exchange system, the reactor effluent has a temperature of about 350° F.

The reactor effluent is then cooled to a temperature of 150° F. in an aerial cooler and is passed to a high pressure flash drum which is operated at a pressure of about 2,400 psia. A gaseous stream comprising 80 mol percent hydrogen and 3 mol percent hydrogen sulfide is removed from the high pressure flash drum and is passed to a compressor where the stream pressure is increased to about 2,700 psia.

Twenty percent by volume of this stream is cooled to a temperature of 110° F. and is passed to an amine contactor wherein this portion of the gas stream is counter-currently contacted with about 9776 BPSD of ethanolamine which is at a temperature of 145° F. The temperatures and pressures are adjusted in the amine contactor so that the treated gas is at a temperature above the hydrocarbon dew point thereby limiting condensation of heavy hydrocarbons.

Amine-treated gas comprising about 84 mol percent hydrogen and essentially no hydrogen sulfide is recycled for admixture with the liquid hydrocarbon desulfurization charge stock at a point upstream of the gas fired heater. Meanwhile, about 80 percent of the untreated and compressed gas stream is recycled for admixture with the desulfurization charge stock at a point downstream of the gas fired heater. The hydrogen sulfide removal treatment of about 20 percent of the total recycled gas removes about 45 percent of the net hydrogen sulfide produced.

The liquid from the high pressure flash drum is passed to a low pressure flash drum which is operated at a pressure of 150 psia. Vapor from the low pressure flash drum is passed to an amine contactor for removal of the hydrogen sulfide and the purified hydrogen is recovered and employed in the process. The liquid bottoms from the low pressure flash drum contains hydrogen sulfide and is passed to the top tray of a synthetic crude stripper for removal of this impurity. The flashed vapor from the original crude is passed to a lower zone in the stripper and hydrogen is introduced into the stripper for removal of hydrogen sulfide from the desulfurized liquid hydrocarbon. In this manner, the flash vapor and the desulfurized now hydrogen sulfide-depleted liquid hydrocarbon fractions are combined and are recovered as a desulfurized synthetic crude product.

Obviously, many modifications and variations of the invention as hereinabove set forth may be made without departing from the spirit and scope thereof, and therefore only such limitations should be imposed as are indicated in the appended claims.

We claim:

1. A process for the desulfurization of a sulfur-containing hydrocarbon fraction which comprises:
    1. admixing the hydrocarbon fraction with substantially hydrogen sulfide-free, hydrogen-containing gas to form a first hydrocarbon-gas mixture, at least a portion of said hydrogen-containing gas being recycled from said process, as described hereinafter;
    2. preheating said first mixture;
    3. admixing said preheated mixture with an effluent gas comprising hydrogen and hydrogen sulfide to form a second hydrocarbon-gas mixture, said effluent gas being recycled from said process, as described hereinafter;

4. subjecting said second mixture to a hydrodesulfurization reaction resulting in a desulfurized reaction effluent;
5. separating said reaction effluent into a liquid hydrocarbon product and said effluent gas;
6. subjecting a first portion of said effluent gas to a hydrogen sulfide removal treatment to produce said substantially hydrogen sulfide-free, hydrogen-containing gas and recycling said gas to step (1);
7. recycling a second portion of said effluent gas to form said second hydrocarbon-gas mixture of step (3), and
8. recovering the hydrogen sulfide removed in step (6).

2. The process of claim 1 wherein between about 10 and about 40 percent by volume of the effluent gas is subjected to a hydrogen sulfide removal treatment.

3. The process of claim 2 wherein about 20 percent by volume of the effluent gas is subjected to a hydrogen sulfide removal treatment.

4. The process of claim 1 wherein the hydrocarbon fraction is preheated to a temperature in the range of between about 500° and about 900° F.

5. The process of claim 1 wherein the hydrogen sulfide-removal treatment comprises contacting said first portion with an absorbent treating agent at a temperature in the range between about 70° to about 140° F.

6. The process of claim 5 wherein the absorbent is an amine.

7. The process of claim 5 wherein the hydrogen sulfide removal treatment is conducted at a temperature above the hydrocarbon dew point of the effluent gas.

* * * * *